Patented Nov. 14, 1939

2,179,560

UNITED STATES PATENT OFFICE 2,179,560

PROCESS OF VITAMIN D CONCENTRATION

Sidney E. Miller, Minneapolis, Minn., assignor to General Mills, Inc., a corporation of Delaware No Drawing. Application June 2, 1939, Serial No. 277,082

4 Claims. (Cl. 167—81)

The present invention relates to vitamin concentration and more particularly to a process of partially removing some of the impurities, associated with synthetic vitamin D concentrates.

This application is a continuation in part of my copending application, Serial Number 232,615, filed September 30, 1938 for Process of vitamin D concentration.

The principal object of my invention is to provide an effective and economical adsorbent for vitamin D which is adapted to adsorb vitamin D and some impurities which may be associated therewith in either naturally occurring or synthetic vitamin D concentrates.

Another object of my invention is to provide a process of concentrating vitamin D from either naturally occurring or synthetic vitamin D concentrates which comprises dissolving vitamin D containing material in a solvent, then filtering the solution through a columnar vessel containing activated tricalcium phosphate whereby a major portion of the vitamin D and of impurities associated therewith are adsorbed on the phosphate, then washing the adsorbed materials by passing a solvent through the column whereby the materials are separated according to their respective solubilities in the solvent and their adsorbability on activated tricalcium phosphate and are thereby located in different positions in the column or in different portions of the filtrate as a result of the washing, then separating the vitamin D containing phosphate and then extracting the vitamin D containing material with a suitable organic solvent.

A further object of my invention is to provide a process of separating or recovering vitamin D from animal or vegetable oils containing the vitamin which comprises introducing the oil into a vessel containing granular activated tricalcium phosphate, and then agitating the oil with the activated tricalcium phosphate whereby a major portion of the vitamin D is adsorbed by the phosphate, and then separating the oil from the phosphate by filtering, and extracting the vitamin D from the phosphate by washing the phosphate with a suitable solvent or extraction medium, and finally concentrating the solvent by distillation to obtain a residue containing vitamin D.

It has heretofore been the practice to produce a vitamin D concentrate from animal oils, such as fish oil, by first saponifying the oil with an aqueous or alcoholic alkaline solution thereby converting the saponifiable material to soaps and the unsaponifiable materials containing vitamin D remain unreacted and are extracted from the soap, using a suitable solvent. The solvent is then concentrated by either distillation or evaporation to produce a vitamin D containing concentrate. This process, however, is somewhat costly due to the time consumed and numerous operations involved and the oil is destroyed by saponification.

My invention is based upon the discovery that by the use of activated tricalcium phosphate as a selective adsorbent for vitamin D, the above mentioned difficulties may be obviated, and that the activated tricalcium phosphate and solvents used in either of the two hereinafter described processes, may be recovered and used repeatedly.

In practicing my invention, I first dissolve vitamin D containing material such as activated ergosterol, in a suitable organic solvent such as petroleum ether, hexane, benzene, or ether, thereby producing a concentrated, vitamin-containing solution. This solution is then filtered by passing it through a columnar vessel containing activated tricalcium phosphate. As a result of this filtration, a major portion of the vitamin D and of impurities associated therewith are adsorbed by the phosphate. The phosphate is then washed with a suitable organic solvent, such as those mentioned above, to separate the materials in the columnar vessel and cause the materials to be located in different parts of the column according to their adsorbability by the phosphate, or, in case sufficient solvent is used, the vitamin containing material may be entirely concentrated in the filtrate. In the latter case, the filtrate may contain not only the vitamin-containing material, but also a major portion of the impurities which were adsorbed by the phosphate. The first fractions of the filtrate will contain those materials which were least adsorbed by the phosphate while the following fractions will contain the materials most readily adsorbed by the phosphate. The fraction containing vitamin D may be identified by any suitable means such as by bioassaying it or by color tests. By removal of the solvent from the fraction by distillation, the vitamin D may be further concentrated.

Instead of using an excess of solvent to remove the adsorbed material from the phosphate in the columnar vessel, the adsorbed materials, including vitamin D, present in the phosphate may be concentrated by removing the lower portion of the phosphate in the columnar vessel and placing it in a vessel containing an organic solvent, such as those previously mentioned. The phosphate is then shaken or agitated with the solvent while the vessel may be heated, if desired, thereby extracting the vitamin D containing material from the phosphate. Solvent remaining in the vitamin concentrate is then removed by distillation or evaporation. The vitamin D potency of the original concentrate is materially increased as a result of the process described above.

Instead of practicing the above-described process, I may recover vitamin D from animal or vegetable oils containing the vitamin by introducing the oil into a vessel containing activated, granular tricalcium phosphate, and, if desired, an organic solvent, such as any of those previously mentioned. The oil is then agitated with the activated tricalcium phosphate and/or solvent whereby a major portion of the vitamin D is adsorbed by the phosphate and the oil is then separated from the phosphate by filtration. And the phosphate is then washed with an organic solvent such as those mentioned above, and finally the solvent is concentrated by distillation to obtain a viscous oily material containing vitamin D.

The following specific example will serve to illustrate and explain my invention. 500 cubic centimeters of petroleum ether solution containing 10 grams of activated ergosterol and having a potency of approximately 120,000 U. S. P. units of vitamin D per cubic centimeter was filtered through a tube containing a column of activated tricalcium phosphate having a diameter of 4.5 cm. and a length of 35 cm.

After filtering the solution of activated ergosterol and without interrupting the filtration process, 1 liter of additional petroleum ether was also passed through the column.

When all of the solvent had passed through the column, the filtration was stopped, the activated tricalcium phosphate was removed from the tube and divided into four equal sections. Each section was extracted with 50 cubic centimeter portions of ethyl ether and the ether was then removed by distillation, leaving a resinous residue.

Most of the vitamin was found to be located in one of the intermediate sections of activated tricalcium phosphate. This material had a potency of 8,500,000 units of vitamin D per gram of material, as determined by bioassay. This represents about a forty per cent increase in vitamin D concentration.

Tricalcium phosphate may be activated to render the compound active or adsorbent by any suitable process. For example, I have found that by heating tricalcium phosphate for a period of about two hours at a temperature of about 120° C. to 130° C. that any adsorbed air in the tricalcium phosphate which might destroy the vitamin is displaced and that the heating for this period of time also eliminates from the tricalcium phosphate occluded moisture. It is believed that the heating operation may increase the adsorption activity of the tricalcium phosphate since it is known that some substances become more active when heated.

My improved product as produced above is suitable for use in fortifying food products which are customarily fortified with vitamin D. The final product is a resinous solid containing about 21%, by weight, of vitamin D which is oil-soluble and when dissolved in vegetable oils, such as sesame oil, cottonseed oil, peanut oil, or olive oil, it may be incorporated in foods by any suitable means.

While the invention has been described in detail with specific examples, such examples are illustrative and are not given as limitations, since other modifications within the spirit and scope of the invention will be apparent to those skilled in the art. Hence, the invention is to be understood as limited only as indicated in the appended claims, in which the intent is to set forth all the novelty over the prior art.

I claim as my invention:

1. A process of concentrating vitamin D from either naturally occurring or synthetic vitamin D concentrates which comprises dissolving vitamin D containing material in an organic solvent, thereby producing a vitamin D containing solution, passing the solution through a mass of activated tricalcium phosphate whereby a major portion of the vitamin D is adsorbed by the phosphate, washing the phosphate with an organic solvent, and then separating the vitamin D from the solvent by distilling off the solvent.

2. A process of concentrating vitamin D from either naturally occurring or synthetic vitamin D concentrates which comprises dissolving vitamin D containing material in an organic solvent thereby producing a vitamin D containing solution, passing the solution through a column of activated tricalcium phosphate whereby a major portion of the vitamin D is adsorbed by the phosphate, removing the lower portion of the phosphate column and heating and agitating it with an organic solvent thereby extracting the vitamin D containing material from the phosphate, and finally removing the solvent by evaporation to produce a vitamin D concentrate.

3. A process of recovering vitamin D from animal or vegetable oils containing the vitamin which comprises agitating the oil with activated tricalcium phosphate and an organic solvent whereby a major portion of the vitamin D is adsorbed by the phosphate, separating the oil from the phosphate by filtration, and then washing the phosphate with an organic solvent.

4. A process as defined in claim 3, in which the organic solvent containing vitamin D is concentrated by distillation to obtain a viscous oily material containing vitamin D.

SIDNEY E. MILLER.